United States Patent
Shimizu et al.

(10) Patent No.: US 10,911,779 B2
(45) Date of Patent: Feb. 2, 2021

(54) MOVING IMAGE ENCODING AND DECODING METHOD, AND NON-TRANSITORY COMPUTER-READABLE MEDIA THAT CODE MOVING IMAGE FOR EACH OF PREDICTION REGIONS THAT ARE OBTAINED BY DIVIDING CODING TARGET REGION WHILE PERFORMING PREDICTION BETWEEN DIFFERENT VIEWS

(71) Applicant: NIPPON TELEGRAPH AND TELEPHONE CORPORATION, Tokyo (JP)

(72) Inventors: Shinya Shimizu, Yokosuka (JP); Shiori Sugimoto, Yokosuka (JP); Akira Kojima, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 125 days.

(21) Appl. No.: 15/029,553

(22) PCT Filed: Oct. 15, 2014

(86) PCT No.: PCT/JP2014/077436
§ 371 (c)(1),
(2) Date: Jul. 21, 2016

(87) PCT Pub. No.: WO2015/056712
PCT Pub. Date: Apr. 23, 2015

(65) Prior Publication Data
US 2016/0255370 A1  Sep. 1, 2016
US 2017/0055000 A2  Feb. 23, 2017

(30) Foreign Application Priority Data
Oct. 17, 2013 (JP) ................. 2013-216526

(51) Int. Cl.
H04N 19/597 (2014.01)
H04N 19/52 (2014.01)
(Continued)

(52) U.S. Cl.
CPC ......... *H04N 19/597* (2014.11); *H04N 13/271* (2018.05); *H04N 19/119* (2014.11);
(Continued)

(58) Field of Classification Search
CPC ............... H04N 2013/0081; H04N 2013/0085
See application file for complete search history.

(56) References Cited

U.S. PATENT DOCUMENTS 5,612,735 A * 3/1997 Haskell .............. H04N 13/0048
348/43
5,619,256 A * 4/1997 Haskell .............. H04N 13/0048
348/43
(Continued)

FOREIGN PATENT DOCUMENTS

CN 102510500 A 6/2012
JP 2013074303 A 4/2013
(Continued)

OTHER PUBLICATIONS

G. Tech, K. Wegner, Y. Chen, & S. Yea, "3D-HEVC Test Model 1", JCT-3V Document A1005 (Jul. 2012) (Year: 2012).*
(Continued)

*Primary Examiner* — David N Werner
(74) *Attorney, Agent, or Firm* — Harness, Dickey & Pierce, P.L.C.

(57) ABSTRACT

A moving image encoding/decoding apparatus that performs encoding/decoding while predicting a multiview moving image including moving images of a plurality of different views includes: a corresponding region setting unit that sets a corresponding region on a depth map for an encoding/
(Continued)

decoding target region; a region dividing unit that sets a prediction region that is one of regions obtained by dividing the encoding/decoding target region; a disparity vector generation unit that generates, for the prediction region, a disparity vector for a reference view using depth information for a region within the corresponding region that corresponds to the prediction region; a motion information generation unit that generates motion information in the prediction region from the reference view motion information based on the disparity vector for the reference view; and a prediction image generation unit that generates a prediction image for the prediction region using the motion information in the prediction region.

18 Claims, 9 Drawing Sheets

(51) Int. Cl.
| | | |
|---|---|---|
| *H04N 19/176* | (2014.01) | |
| *H04N 19/119* | (2014.01) | |
| *H04N 19/174* | (2014.01) | |
| *H04N 13/271* | (2018.01) | |
| *H04N 19/172* | (2014.01) | |
| *H04N 13/00* | (2018.01) | |

(52) U.S. Cl.
CPC ......... *H04N 19/172* (2014.11); *H04N 19/174* (2014.11); *H04N 19/176* (2014.11); *H04N 19/52* (2014.11); *H04N 2013/0081* (2013.01); *H04N 2013/0085* (2013.01)

(56) References Cited

U.S. PATENT DOCUMENTS

| | | | | |
|---|---|---|---|---|
| 2011/0211638 A1* | 9/2011 | Sohn | ............... | H04N 19/597 |
| | | | | 375/240.16 |
| 2011/0292044 A1* | 12/2011 | Kim | ............... | H04N 13/122 |
| | | | | 345/419 |
| 2013/0077880 A1* | 3/2013 | Venkataraman | ..... | H04N 19/136 |
| | | | | 382/232 |
| 2013/0147843 A1* | 6/2013 | Shimizu | ............... | G06T 11/60 |
| | | | | 345/647 |
| 2013/0336589 A1* | 12/2013 | Takahashi | ............... | G06T 9/00 |
| | | | | 382/215 |
| 2014/0092210 A1* | 4/2014 | Tian | ............... | H04N 19/597 |
| | | | | 348/43 |
| 2014/0241434 A1* | 8/2014 | Lin | ............... | H04N 19/597 |
| | | | | 375/240.16 |

FOREIGN PATENT DOCUMENTS

| | | | |
|---|---|---|---|
| WO | WO-2008/053758 A1 | 5/2008 | |
| WO | WO-2013001813 A1 | 1/2013 | |

OTHER PUBLICATIONS

Japan Patent Office, International Preliminary Report on Patentability for PCT/JP2014/077436 (dated Apr. 17, 2016) (Year: 2016).*
K.M. Wong, L.M. Po. K.W. Cheung, K.H. Ng, & Xuyuan Xu, "Stretching, Compression and Shearing Disparity Compensated Prediction techniques for Stereo and Multiview Video Coding", 2011 IEEE Int'l Conference on Acoustics, Speech & Signal Processing 841-844 (May 2011) (Year: 2011).*
ITU-T Recommendation H.264 (Mar. 2009), "Advanced video coding for generic audiovisual services", Mar. 2009.
S. Shimizu et al., "Adaptive appearance compensated view synthesis prediction for Multiview Video Coding", 2009 16th IEEE International Conference on Image Processing (ICIP), pp. 2949-2952, Nov. 7-10, 2009.
Gerhard Tech et al., "3D-HEVC Test Model 1", JCT3V-A1005_d0, ITU-T, Sep. 20, 2013, p. 12-21.
Yu-Lin Chang et al., "3D-CE2. h related: Simplified DV derivation for DoNBDV and BVSP", JCT3V-D0138, ITU-T, Apr. 13, 2013, p. 1-4.
Shinya Shimizu et al., "Depth Map o Mochiita Sanjigen Eizo Fugoka no Kokusai Hyojunka Doko", IPSJ SIG Notes, Sep. 5, 2013, vol. 2013-AVM-82, No. 11, pp. 1 to 6.
International Search Report for PCT/JP2014/077436, ISA/JP, dated Jan. 13, 2015.
Decision of Rejection in corresponding Japanese application 2015-542635, dated Oct. 3, 2017, with English translation attached.
Olivier Faugeras, "Three-Dimensional Computer Vision", pp. 33-66, MIT Press; BCTC/UFF-006.37 F259 1993, ISBN:0-262-06158-9.
Chinese Office Action in parallel application CN 20148005661.6, SIPO, dated Feb. 1, 2018, with partial translation of Search Report.

* cited by examiner

MOVING IMAGE ENCODING AND DECODING METHOD, AND NON-TRANSITORY COMPUTER-READABLE MEDIA THAT CODE MOVING IMAGE FOR EACH OF PREDICTION REGIONS THAT ARE OBTAINED BY DIVIDING CODING TARGET REGION WHILE PERFORMING PREDICTION BETWEEN DIFFERENT VIEWS

TECHNICAL FIELD

The present invention relates to a moving image encoding method, a moving image decoding method, a moving image encoding apparatus, a moving image decoding apparatus, a moving image encoding program, and a moving image decoding program that encode and decode a multiview moving image.

Priority is claimed on Japanese Patent Application No. 2013-216526, filed Oct. 17, 2013, the content of which is incorporated herein by reference.

BACKGROUND ART

Conventionally known is a multiview image including a plurality of images in which the same object and background are photographed with a plurality of cameras. A moving image captured with a plurality of cameras is referred to as a multiview moving image (or a multiview video). In the description below, an image (moving image) captured with a single camera is referred to as a "two-dimensional image (two-dimensional moving image)". A group of two-dimensional images (two-dimensional moving images) in which the same object and background are photographed with a plurality of cameras with different positions and orientations (hereunder referred to views) is referred to as a "multiview image (multiview moving image)".

Two-dimensional moving images have a strong correlation in the time domain, and the coding efficiency can be increased by utilizing the correlation. On the other hand, in multiview images and multiview moving images, if cameras are synchronized, frames (images) corresponding to the same time in videos of the cameras are those in which the object and the background are in completely the same state and photographed from different positions. Therefore, there is a strong correlation between the cameras (between different two-dimensional images of the same time). In the coding of multiview images and multiview moving images, the coding efficiency can be increased by utilizing the correlation.

Here, conventional techniques relating to encoding techniques for two-dimensional moving images are described. In many conventional two-dimensional moving-image coding schemes, including H.264, MPEG-2, and MPEG-4, which are international coding standards, highly efficient encoding is performed by utilizing the techniques of motion-compensated prediction, orthogonal transform, quantization, and entropy encoding. In H.264, for example, encoding using a time correlation between an encoding target frame and a plurality of past or future frames is possible.

Details of the motion-compensated prediction technique used in H.264 are disclosed in, for example, Non-Patent Document 1. A summary of the motion-compensated prediction technique used in H.264 is described. The motion-compensated prediction of H.264 divides an encoding target frame into blocks of various sizes, and allows each block to have a different motion vector and a different reference frame. High-accuracy prediction which compensates for a different motion of each object is achieved by using a different motion vector for each block. On the other hand, high-accuracy prediction that considers occlusions generated with a temporal change is achieved by using a different reference frame for each block.

Next, a conventional coding scheme for multiview images and multiview moving images is described. A difference between a multiview image coding method and a multiview moving image coding method is that a correlation in the time domain and the correlation between the cameras exist at the same time in a multiview moving image. However, in either case, the correlation between the cameras can be utilized by the same method. Consequently, a method used in the coding of multiview moving images is described here.

In the coding of multiview moving images, there conventionally exists a scheme that encodes a multiview moving image with a high efficiency by means of "disparity-compensated prediction", in which motion-compensated prediction is applied to images that have been captured by different cameras at the same time, in order to utilize the correlation between the cameras. Here, the disparity is a difference between positions at which the same portion on an object is present on the image planes of cameras arranged at different positions. FIG. 8 is a schematic diagram showing the disparity that occurs between cameras (a first camera and a second camera). In the schematic diagram shown in FIG. 8, the image planes of the cameras with parallel optical axes are viewed perpendicularly from above. In this manner, the positions at which the same portion of the object is projected on the image planes of the different cameras are generally referred to as corresponding points.

In the disparity-compensated prediction, each pixel value of an encoding target frame is predicted from a reference frame based on the correspondence relationship, and a prediction residual thereof and disparity information indicating the correspondence relationship are encoded. The disparity varies depending on a target pair of cameras and positions. Therefore, it is necessary to encode disparity information for each region in which disparity-compensated prediction is performed. Actually, in the H.264 multiview moving image coding scheme, a vector indicating the disparity information is encoded for each block in which disparity-compensated prediction is used.

The correspondence relationship provided by the disparity information can be expressed by using camera parameters as a one-dimensional quantity that indicates a three-dimensional position of an object, rather than a two-dimensional vector, based on an epipolar geometry constraint. Various expressions exist as the information indicating the three-dimensional position of the object. However, the distance from a reference camera to the object, or coordinate values on an axis which is not parallel to the image plane of a camera are normally used. It is to be noted that, in some cases, the reciprocal of a distance is used rather than the distance. Furthermore, the reciprocal of the distance is information that is proportional to the disparity. Therefore, in some cases, two reference cameras are set, and a three-dimensional position is expressed as a disparity amount between images captured by the cameras. There is no essential difference regardless of the expression used. Consequently, hereunder, no distinction in the expression is made, and the information indicating the three-dimensional positions is expressed as a depth.

FIG. 9 is a schematic diagram of the epipolar geometry constraint. According to the epipolar geometry constraint, a point on an image of a given camera corresponding to a point on an image of another camera is constrained to be on a straight line referred to as an epipolar line. At this time, if the depth corresponding to the pixel can be obtained, a corresponding point is uniquely defined on the epipolar line. As shown in FIG. 9, for example, a corresponding point in an image of a second camera for an object projected at a position m in an image of a first camera is projected at a position m' on the epipolar line if the position of the object in real space is M', and is projected at a position m" on the epipolar line if the position of the object in real space is M".

Non-Patent Document 2 utilizes this property to generate a synthesis image for a coding target frame from a reference frame in accordance with the three-dimensional information of each object provided by a depth map (distance image) for the reference frame and set the generated synthesis image as a predicted image candidate for each region, thereby realizing high-accuracy prediction and efficient coding of a multiview moving image. It is to be noted that the synthesis image generated based on the depth is referred to as a view-synthesis image, a view-interpolated image, or a disparity-compensated image.

PRIOR ART DOCUMENTS

Non-Patent Documents

Non-Patent Document 1: ITU-T Recommendation H.264 (March 2009), "Advanced video coding for generic audiovisual services", March, 2009.
Non-Patent Document 2: S. Shimizu, H. Kimata, and Y. Ohtani, "Adaptive appearance compensated view synthesis prediction for Multiview Video Coding", 2009 16th IEEE International Conference on Image Processing (ICIP), pp. 2949-2952, 7-10 Nov. 2009.

SUMMARY OF INVENTION

Problems to be Solved by the Invention

According to the method disclosed in Non-Patent Document 2, it is possible to achieve highly efficient prediction by means of a view synthesis image, in which high-accuracy disparity compensation has been performed using the three-dimensional information of an object obtained from a depth map. Furthermore, by selecting an existing prediction or a prediction from the view synthesis image for each region, even when a view synthesis image having a partly low accuracy due to the influence of the depth map quality and/or occlusions is generated, it is possible to prevent the bitrate from increasing by selecting whether or not the view synthesis image is used as the prediction image for each region.

However, in the method disclosed in Non-Patent Document 2, if the accuracy of the three-dimensional information expressed by the depth map is low, the disparity can only be compensated with a low accuracy compared to general disparity-compensated prediction using a disparity vector. Therefore, it has a problem in that highly efficient prediction cannot be achieved.

The present invention has been made in light of such circumstances, and an object thereof is to provide a moving image encoding method, a moving image decoding method, a moving image encoding apparatus, a moving image decoding apparatus, a moving image encoding program, and a moving image decoding program that achieve high-accuracy prediction and highly efficient coding even when the accuracy of a disparity amount expressed by a depth map is low.

Means for Solving the Problem

An aspect of the present invention is a moving image encoding apparatus that, at the time a single frame of a multiview moving image including moving images of a plurality of different views is encoded, while performing prediction between the different views using reference view motion information that is motion information in a reference view image for a reference view that is different from an encoding target image and a depth map for object within the multiview moving image, performs encoding of an encoding target region that is one of regions obtained by dividing the encoding target image, the moving image encoding apparatus including: a corresponding region setting unit that sets a corresponding region on the depth map for the encoding target region; a region dividing unit that sets a prediction region that is one of regions obtained by dividing the encoding target region; a disparity vector generation unit that, for the prediction region, generates a disparity vector for the reference view using depth information for a region within the corresponding region that corresponds to the prediction region; a motion information generation unit that generates motion information in the prediction region from the reference view motion information based on the disparity vector for the reference view; and a prediction image generation unit that generates a prediction image for the prediction region using the motion information in the prediction region.

In the moving image encoding apparatus of the present invention, the disparity vector generation unit may further generate, for the encoding target region, a disparity vector for the depth map, and the corresponding region setting unit may set a region indicated by the disparity vector for the depth map as the corresponding region.

In the moving image encoding apparatus of the present invention, the disparity vector generation unit may set the disparity vector for the depth map using a disparity vector used at the time a region adjacent to the encoding target region is encoded.

In the moving image encoding apparatus of the present invention, the region dividing unit may set a region division for the encoding target region based on depth information within the corresponding region.

In the moving image encoding apparatus of the present invention, the disparity vector generation unit may set, for the prediction region, a representative depth from the depth information in the region within the corresponding region that corresponds to the prediction region and may set the disparity vector for the reference view based on the representative depth.

In the moving image encoding apparatus of the present invention, the motion information generation unit may determine a corresponding position in the reference view using a pixel position previously determined for the prediction region and the disparity vector for the reference view, and may set motion information provided for a region including the corresponding position among the reference view motion information as the motion information in the prediction region.

The moving image encoding apparatus of the present invention may further include a reference image setting unit that sets a single already-encoded frame in an encoding target view that is different from the encoding target image as a reference image for the encoding target image, and the motion information generation unit may generate the motion information in the prediction region by scaling motion information obtained from the reference view motion information in accordance with a time interval between the encoding target image and the reference image.

In the moving image encoding apparatus of the present invention, the prediction image generation unit may generate the prediction image for the prediction region using a first prediction image generated using the motion information in the prediction region and a second prediction image generated using the disparity vector for the reference view and the reference view image.

An aspect of the present invention is a moving image decoding apparatus that, at the time a decoding target image is decoded from encoded data of a multiview moving image including moving images of a plurality of different views, while performing prediction between the different views using reference view motion information that is motion information in a reference view image for a reference view that is different from the decoding target image and a depth map for an object within the multiview moving image, performs decoding of a decoding target region that is one of regions obtained by dividing the decoding target image, the moving image decoding apparatus including: a corresponding region setting unit that sets a corresponding region on the depth map for the decoding target region; a region dividing unit that sets a prediction region that is one of regions obtained by dividing the decoding target region; a disparity vector generation unit that, for the prediction region, generates a disparity vector for the reference view using depth information for a region within the corresponding region that corresponds to the prediction region; a motion information generation unit that generates motion information in the prediction region from the reference view motion information based on the disparity vector for the reference view; and a prediction image generation unit that generates a prediction image for the prediction region using the motion information in the prediction region.

In the moving image decoding apparatus of the present invention, the disparity vector generation unit may further generate, for the decoding target region, a disparity vector for the depth map, and the corresponding region setting unit may set a region indicated by the disparity vector for the depth map as the corresponding region.

In the moving image decoding apparatus of the present invention, the disparity vector generation unit may set the disparity vector for the depth map using a disparity vector used at the time a region adjacent to the decoding target region is decoded.

In the moving image decoding apparatus of the present invention, the region dividing unit may set a region division for the decoding target region based on depth information within the corresponding region.

In the moving image decoding apparatus of the present invention, the disparity vector generation unit may set, for the prediction region, a representative depth from the depth information in the region within the corresponding region that corresponds to the prediction region and may set the disparity vector for the reference view based on the representative depth.

In the moving image decoding apparatus of the present invention, the motion information generation unit may determine a corresponding position in the reference view using a pixel position previously determined for the prediction region and the disparity vector for the reference view, and may set motion information provided for a region including the corresponding position among the reference view motion information as the motion information in the prediction region.

The moving image decoding apparatus of the present invention may further include a reference image setting unit that sets a single already-decoded frame in a decoding target view that is different from the decoding target image as a reference image for the decoding target image, and the motion information generation unit may generate the motion information in the prediction region by scaling motion information obtained from the reference view motion information in accordance with a time interval between the decoding target image and the reference image.

In the moving image decoding apparatus of the present invention, the prediction image generation unit may generate the prediction image for the prediction region using a first prediction image generated using the motion information in the prediction region and a second prediction image generated using the disparity vector for the reference view and the reference view image.

An aspect of the present invention is a moving image encoding method that, at the time a single frame of a multiview moving image including moving images of a plurality of different views is encoded, while performing prediction between the different views using reference view motion information that is motion information in a reference view image for a reference view that is different from an encoding target image and a depth map for an object within the multiview moving image, performs encoding of an encoding target region that is one of regions obtained by dividing the encoding target image, the moving image encoding method including: a corresponding region setting step of setting a corresponding region on the depth map for the encoding target region; a region dividing step of setting a prediction region that is one of regions obtained by dividing the encoding target region; a disparity vector generation step of generating, for the prediction region, a disparity vector for the reference view using depth information for a region within the corresponding region that corresponds to the prediction region; a motion information generation step of generating motion information in the prediction region from the reference view motion information based on the disparity vector for the reference view; and a prediction image generation step of generating a prediction image for the prediction region using the motion information in the prediction region.

An aspect of the present invention is a moving image decoding method that, at the time a decoding target image is decoded from encoded data of a multiview moving image including moving images of a plurality of different views, while performing prediction between the different views using reference view motion information that is motion information in a reference view image for a reference view that is different from the decoding target image and a depth map for an object within the multiview moving image, performs decoding of a decoding target region that is one of regions obtained by dividing the decoding target image, the moving image decoding method including: a corresponding region setting step of setting a corresponding region on the depth map for the decoding target region; a region dividing step of setting a prediction region that is one of regions obtained by dividing the decoding target region; a disparity vector generation step of generating, for the prediction region, a disparity vector for the reference view using depth information for a region within the corresponding region that corresponds to the prediction region; a motion information generation step of generating motion information in the prediction region from the reference view motion information based on the disparity vector for the reference view; and a prediction image generation step of generating a prediction image for the prediction region using the motion information in the prediction region.

An aspect of the present invention is a moving image encoding program for executing the moving image encoding method on a computer.

An aspect of the present invention is a moving image decoding program for executing the moving image decoding method on a computer.

Advantageous Effects of the Invention

The present invention provides an advantageous effect that it becomes possible to achieve prediction of fractional pixel accuracy and code a multiview moving image with a small bitrate even when the accuracy of disparity expressed by a depth map is low.

MODES FOR CARRYING OUT THE INVENTION

Hereunder, a moving image encoding apparatus and a moving image decoding apparatus in accordance with an embodiment of the present invention are described with reference to the drawings. The following description assumes a case in which a multiview moving image captured using two cameras, namely a first camera (referred to as camera A) and a second camera (referred to as camera B), is to be encoded, and a single frame of a moving image of camera B is encoded or decoded using camera A as a reference view. It is to be noted that information necessary for obtaining a disparity from depth information is assumed to be separately provided. Specifically, the information includes extrinsic parameters that indicate the positional relationship between camera A and camera B, intrinsic parameters that indicate projection information toward the image plane that depends on the camera, and the like. However, other information in other forms may be provided as long as the disparity can be obtained from the depth information. A detailed description related to the camera parameters is described in, for example, a reference document, Olivier Faugeras, "Three-Dimensional Computer Vision", pp. 33-66, MIT Press; BCTC/UFF-006.37 F259 1993, ISBN:0-262-06158-9. In the reference document, a description related to parameters that indicate the positional relationship of a plurality of cameras and parameters that indicate projection information towards the image plane that depends on the camera is disclosed.

The following description assumes that information (e.g., coordinate values or an index that is able to be mapped to coordinate values) sandwiched by [ ] symbols that is able to specify a position is added to an image, a video frame, or a depth map to indicate an image signal sampled by a pixel at the position, or a depth therefor. Furthermore, it is assumed that the addition of an index value that is able to be mapped to coordinate values or a block to a vector indicates coordinate values or a block having a position in which the coordinates or the block is shifted by the amount of the vector.

Figure 1:
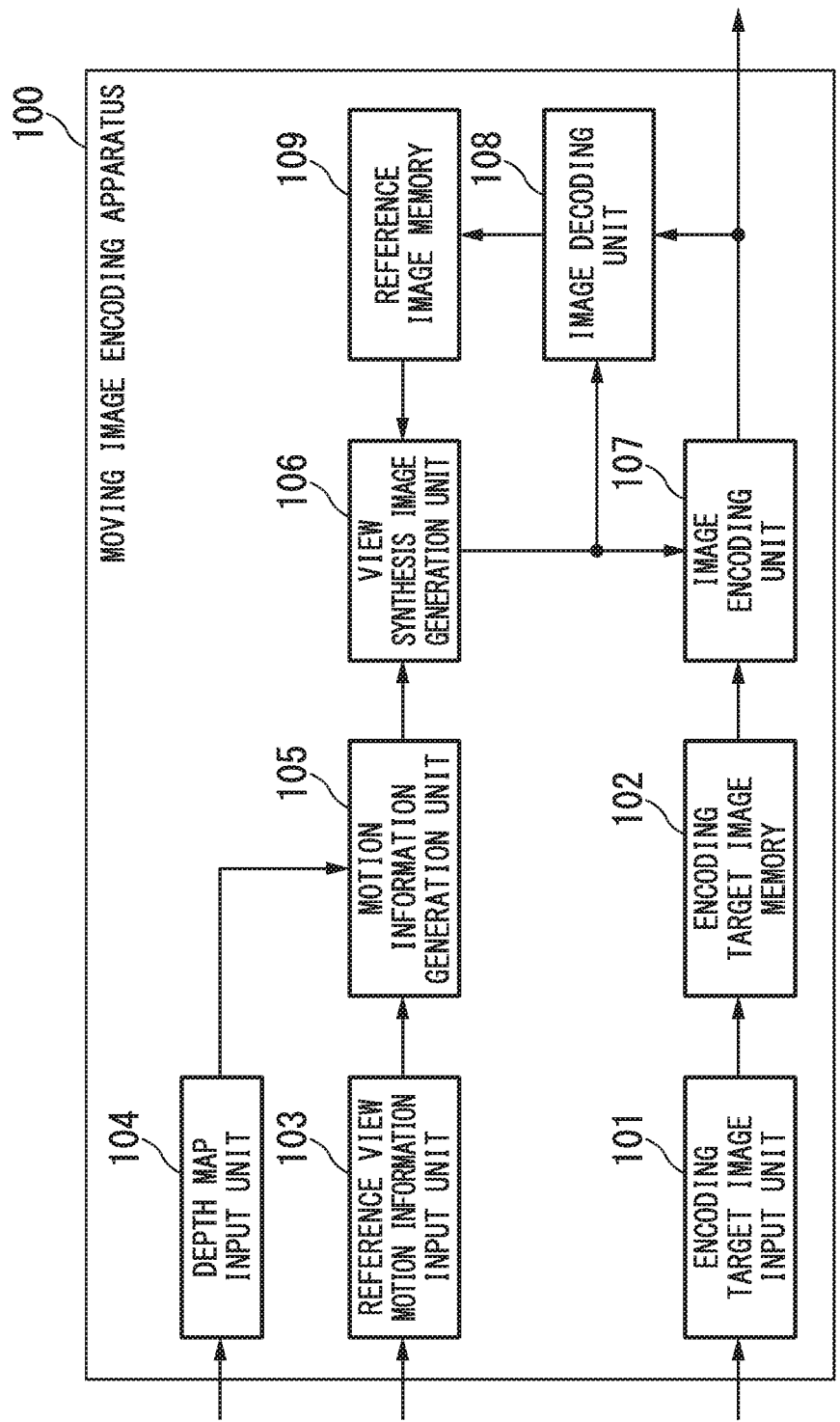
FIG. 1 is a block diagram showing a configuration of a moving image encoding apparatus in accordance with an embodiment of the present invention.

FIG. 1 is a block diagram showing a configuration of a moving image encoding apparatus in accordance with the present embodiment. As shown in FIG. 1, the moving image encoding apparatus 100 is provided with an encoding target image input unit 101, an encoding target image memory 102, a reference view motion information input unit 103, a depth map input unit 104, a motion information generation unit 105, a view synthesis image generation unit 106, an image encoding unit 107, an image decoding unit 108, and a reference image memory 109.

The encoding target image input unit 101 inputs an image that becomes an encoding target. Hereunder, the image that serves as the encoding target is referred to as an encoding target image. Here, it is assumed that a moving image of camera B is input one frame at a time. Furthermore, the view from which the encoding target image is captured (here, camera B) is referred to as an encoding target view. The encoding target image memory 102 stores the input encoding target image. The reference view motion information input unit 103 inputs motion information (a motion vector or the like) for a moving image in a reference view. In the following, the motion information input here is referred to as reference view motion information. Here, it is assumed that motion information of camera A is input.

The depth map input unit 104 inputs a depth map that is referred to at the time a view synthesis image is generated. Here, it is assumed that a depth map for the encoding target image is input. However, it may also be a depth map for a different view, such as the reference view. It is to be noted that the depth map indicates the three-dimensional position of an object shown in pixels of a corresponding image. The depth map may be any type of information as long as the three-dimensional position can be obtained from separately provided information, such as camera parameters. For example, the distance from a camera to the object, coordinate values for an axis that is not parallel to the image plane, or a disparity amount for another camera (e.g., camera A) can be used. Furthermore, since it is sufficient for the disparity amount to be obtained here, a disparity map that directly expresses the disparity amount may be used instead of a depth map. It is to be noted that here, the depth map is given in the form of an image, but it is not necessarily in the form of an image as long as the same information can be obtained.

The motion information generation unit 105 uses the reference view motion information and the depth map to generate motion information for the encoding target image. The view synthesis image generation unit 106 generates a view synthesis image for the encoding target image from a reference image based on the generated motion information. The image encoding unit 107 performs predictive encoding on the encoding target image while using the view synthesis image. The image decoding unit 108 performs decoding on a bitstream of the encoding target image. The reference image memory 109 stores an image obtained at the time the decoding is performed on the bitstream of the encoding target image.

Figure 2:
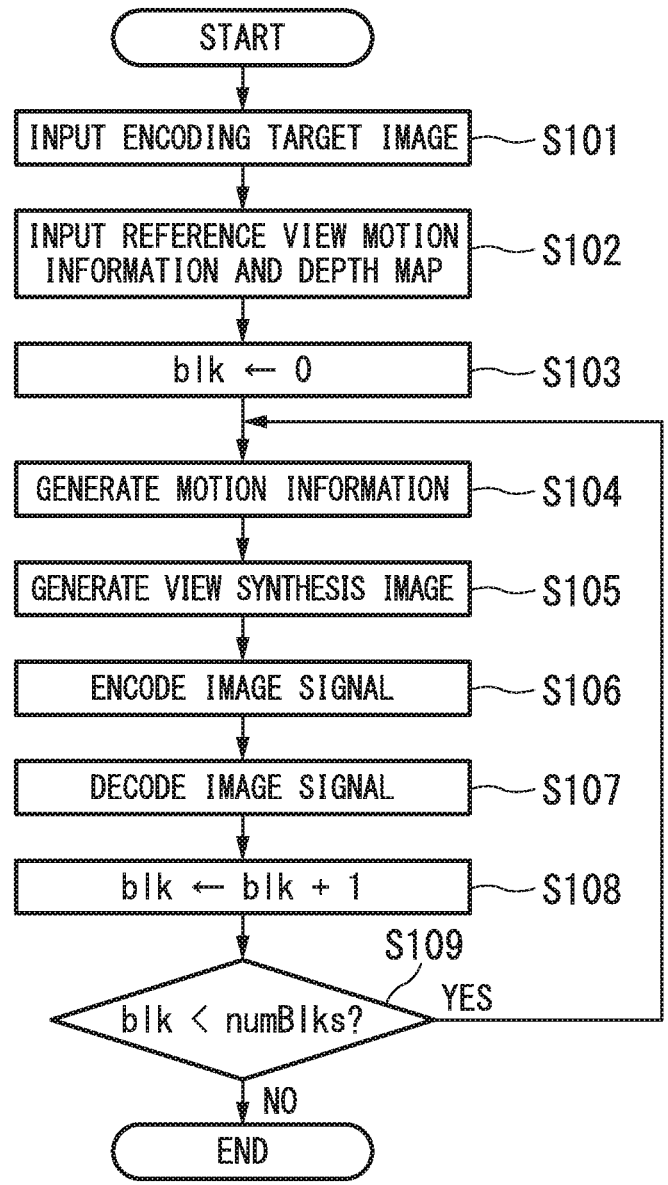
FIG. 2 is a flowchart showing an operation of the moving image encoding apparatus 100 shown in FIG. 1.

Next, an operation of the moving image encoding apparatus 100 shown in FIG. 1 is described with reference to FIG. 2. FIG. 2 is a flowchart showing the operation of the moving image encoding apparatus 100 shown in FIG. 1. Firstly, the encoding target image input unit 101 inputs an encoding target image Org and stores the input encoding target image Org in the encoding target image memory 102 (step S101). Next, the reference view motion information input unit 103 inputs reference view motion information and outputs the input reference view motion information to the motion information generation unit 105. The depth map input unit 104 inputs a depth map and outputs the input depth map to the motion information generation unit 105 (step S102).

It is to be noted that the reference view motion information and the depth map input in step S102 are assumed to be the same as those obtained on the decoding end, such as those obtained by performing decoding on already encoded reference view motion information and depth map. This is in order to suppress the generation of coding noise, such as drift, by using exactly the same information as that obtained by a decoding apparatus. However, if the generation of such coding noise is allowed, it is acceptable for those obtained only on the encoding end, such as those prior to encoding, to be input. For the depth map, in addition to a depth map obtained by performing decoding on an already encoded depth map, a depth map that is estimated by applying stereo matching or the like to a multiview moving image that has been decoded with respect to a plurality of cameras, a depth map estimated using a decoded disparity vector or motion vector, or the like, may also be used as the depth map that is the same as that obtained on the decoding end.

As the reference view motion information, motion information used at the time an image for the reference view was encoded may be used, or motion information separately encoded for the reference view may be used. Furthermore, it is possible to decode the moving image for the reference view and to use motion information obtained by estimation therefrom.

Following completion of the input of the encoding target image, the reference view motion information, and the depth map, the encoding target image is divided into regions with a predetermined size, and the video signal of the encoding target image is encoded for each of the divided regions (steps S103 to S109). That is, when an encoding target region index is denoted as blk and the total number of encoding target regions within a single frame is denoted as numBlks, blk is initialized to 0 (step S103) and then the following processing (steps S104 to S107) is repeated while adding 1 to blk (step S108) until blk reaches numBlks (step S109). In a general coding, division into processing unit blocks of 16 pixels×16 pixels referred to as macro blocks is performed. However, division into blocks of another size may be performed as long as it is the same as that on the decoding end.

In the processing repeated for each encoding target region, firstly, the motion information generation unit 105 generates motion information for the encoding target region blk (step S104). The processing here is described in detail below. Once the motion information for the encoding target region blk is obtained, the view synthesis image generation unit 106 generates a view synthesis image Syn for the encoding target region blk from an image stored in the reference image memory 109 in accordance with the motion information (step S105). Specifically, the view synthesis image generation unit 106 generates the view synthesis image Syn by calculating, for each of pixels p included in the encoding target region blk, a pixel value of a corresponding point on a reference image indicated by the motion information, as expressed by the following formula.

$$Syn[p]=Dec_{Ref(p)}[p+mv(p)]$$

Here, mv(p) and Ref(p) denote a motion vector indicated by the motion information for the pixel p and the time interval thereof, and $Dec_T$ denotes an image (reference image) that is stored in the reference image memory 109 at a time interval T relative to the encoding target image. It is to be noted that if the corresponding point p+mv(p) is not present at an integer pixel position, the pixel value of the nearest integer pixel position may be set as the pixel value of the corresponding point, or the pixel value of the corresponding point may be generated by applying filter processing to a group of integer pixels surrounding the corresponding point. However, it is assumed that the pixel value of the corresponding point is generated with the same method as the processing on the decoding end.

If two or more pieces of motion information for the pixel p are present, the view synthesis image may be generated as the average value thereof. That is, when the number of pieces of the motion information for the pixel p is denoted as N(p) and n is a motion information index, the view synthesis image is expressed by the following formula.

$$Syn[p] = \frac{1}{N(p)}\sum_{n=1}^{N(p)} Dec_{Ref_n(p)}[p + mv_n(p)] \quad \text{[Formula 1]}$$

It is to be noted that the formula does not consider rounding to an integer in the division. However, an offset may be added so that rounding is performed. Specifically, division by N(p) is performed after addition of N(p)/2. Furthermore, if three or more pieces of motion information exist, prediction may be performed using a median rather than the average value. However, it is necessary to perform the same processing as that on the decoding end. Here, the view synthesis image is generated for each pixel. However, when the motion information within each small region is the same, the processing can also be performed for each small region.

Next, once the view synthesis image is obtained, the image encoding unit 107 encodes the video signal (pixel values) of the encoding target image in the encoding target region blk while using the view synthesis image as a prediction image (step S106). A bitstream obtained as a result of the encoding becomes the output of the moving image encoding apparatus 100. It is to be noted that any type of method may be used as the method of encoding. In general coding such as MPEG-2 and H.264/AVC, encoding is performed by sequentially applying a frequency transform such as a discrete cosine transform (DCT), quantization, binarization, and entropy encoding to a difference signal between the video signal of the block blk and the prediction image.

Then, the image decoding unit 108 decodes the video signal for the block blk using the bitstream and the view synthesis image, and stores a decoded image Dec[blk], which is the decoded result, in the reference image memory 109 (step S107). Here, a technique corresponding to the technique used at the time of encoding is used. For example, in general coding such as MPEG-2 and H.264/AVC, the video signal is decoded by sequentially applying entropy decoding, inverse binarization, inverse quantization, and a frequency inverse transform such as an inverse discrete cosine transform (IDCT) to encoded data, adding the prediction image to the obtained two-dimensional signal, and lastly performing clipping within the range of the pixel values. It is to be noted that the decoding may be performed by receiving data immediately prior to the processing on the encoding end becoming lossless and the prediction image and performing a simplified processing. That is, in the example described above, the video signal may be decoded by receiving values after applying quantization processing at the time of encoding and the prediction image, adding the prediction image to the two-dimensional signal obtained by sequentially applying inverse quantization and frequency inverse transform to the quantized values, and performing clipping within the range of the pixel values.

Figure 3:
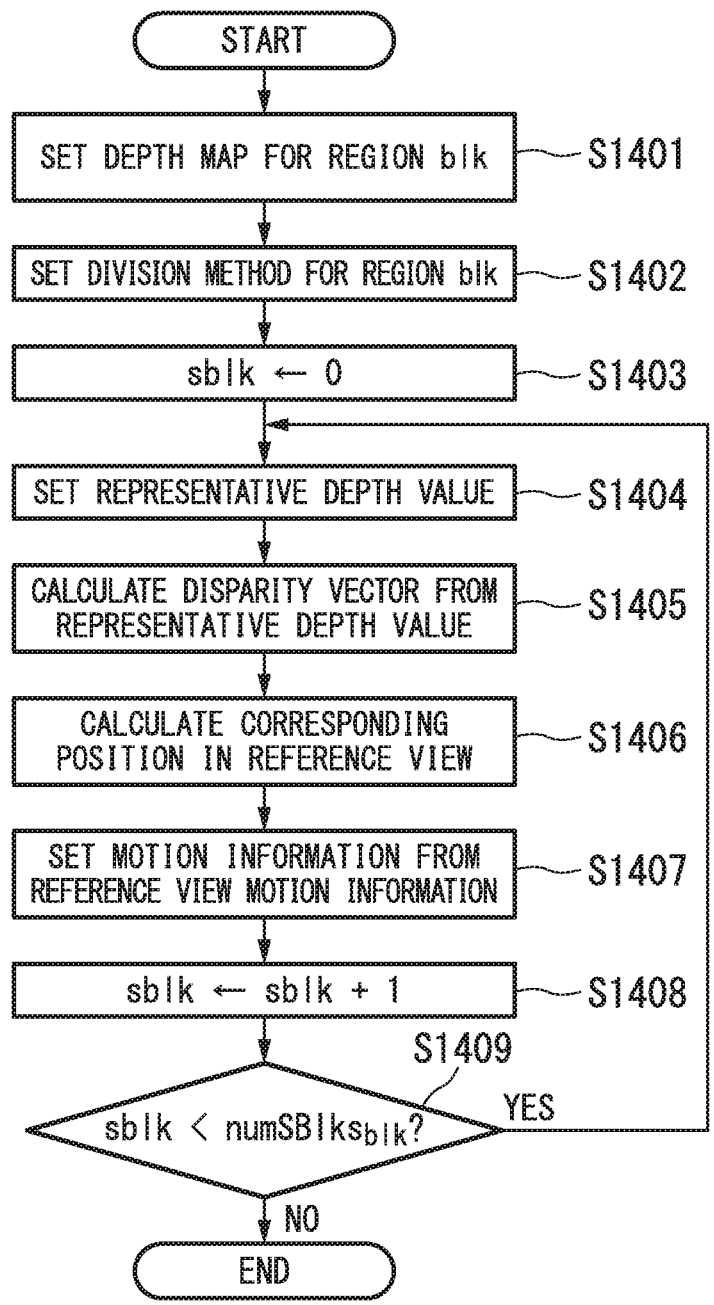
FIG. 3 is a flowchart showing a detailed processing operation of an operation that generates motion information (step S104) in a motion information generation unit 105 shown in FIG. 1.

Next, the processing in which the motion information generation unit 105 shown in FIG. 1 generates the motion information for the encoding target region blk (step S104 shown in FIG. 2) is described in detail with reference to FIG. 3. In the processing that generates the motion information, the motion information generation unit 105 firstly sets a region on the depth map for the encoding target region blk (a corresponding region on the depth map for the encoding target region) (step S1401). Here, since the depth map for the encoding target image is input, a depth map with the same position as the encoding target region blk is set. It is to be noted that if the resolution of the encoding target image is different from that of the depth map, a region that has been scaled in accordance with a resolution ratio is set.

When one of the views that is different from the encoding target view is set as a depth view and a depth map for the depth view is used, a disparity DV (a disparity vector for the depth map) between the encoding target view and the depth view in the encoding target region blk is calculated, and a depth map in blk+DV is set. It is to be noted that if the resolution of the encoding target image is different from that of the depth map, a scaling of the position and the size is performed in accordance with a resolution ratio.

The disparity DV between the encoding target view and the depth view in the encoding target region blk may be calculated using any method as long as it is the same method as the decoding end. For example, a disparity vector used at the time a region adjacent to the encoding target region blk was encoded, a global disparity vector set for the entire encoding target image or a partial image that contains the encoding target region, a disparity vector that is separately set and encoded for the encoding target region, or the like can be used. Furthermore, it is acceptable for a disparity vector used for a region that is different from the encoding target region blk or for a previously encoded image to be stored, and for the stored disparity vector to be used. In addition, a disparity vector obtained by transforming a depth value at the same position as the encoding target region in a previously encoded depth map for the encoding target view may be used.

Then, the motion information generation unit 105 determines a division method for the encoding target region blk (step S1402). As the division method, division may be performed by a predetermined method, or the division method may be determined by analyzing the set depth map. However, the division method is set by the same method as the decoding end.

The predetermined method includes a method that sets the division with a fixed block size. Examples include a method that performs division into 4 pixel×4 pixel blocks or 8 pixel×8 pixel blocks. Furthermore, it also includes a method that determines the division size in accordance with the size of the encoding target region blk. When the size of the encoding target region is 2N×2M, examples include a method that performs division into (N/2)×(M/2) blocks or MAX(N/2, 4)×MAX(M/2, 4) blocks. It is to be noted that MAX(a, b) denotes the maximum value of a and b. Furthermore, it also includes a method that performs division into 8 pixel×8 pixel blocks if the size of the encoding target region is larger than 16 pixels×16 pixels, and performs division into a 4 pixel×4 pixel block size if the size of the encoding target region is 16 pixels×16 pixels or smaller, and the like.

As the method that determines the division method by analyzing the depth map, there is, for example, a method that uses a result of clustering based on the depth values, and a method that recursively performs division with a quadtree representation so that the variance of the depth values for each generated division is less than or equal to a threshold. The division method may be determined by comparing the depth values at the four vertices of the corresponding region on the depth map for the encoding target region, instead of the variance of the depth values for each generated division.

Then, once the division method of the encoding target region blk is determined, motion information is generated for each subregion (prediction region) generated in accordance with the division method (steps S1403 to S1409). That is, when the subregion index is denoted as sblk and the number of subregions within the encoding target region blk is denoted as $numSBlks_{blk}$, sblk is initialized to 0 (step S1403) and then the following processing (steps S1404 to S1407) is repeated while adding 1 to sblk (step S1408) until sblk reaches $numSBlks_{blk}$ (step S1409).

In the processing that is repeated for each subregion, the motion information generation unit 105 firstly sets a representative depth value from the set depth map (depth information for the region within the corresponding region that corresponds to the prediction region) for the subregion sblk (step S1404). Although the representative depth value may be determined using any method, it is necessary to use the same method as the decoding end. Examples include a method using an average value, a median, a maximum value, a minimum value of the depth map for the subregion sblk, or the like. Furthermore, rather than using all of the pixels of the depth map for the subregion sblk, an average value, a median, a maximum value, a minimum value, or the like of the depth values for part of the pixels may be used. The part of the pixels may be the four vertices or the four vertices and the center, or the like. Further, it also includes a method in which a depth value for a predetermined position, such as the upper left or the center of the subregion sblk, is used.

Once the representative depth value is obtained, the motion information generation unit 105 uses information on the positional relationship between the encoding target view and the reference view to calculate a disparity vector $dv_{sblk}$ (a disparity vector for the reference view) from the representative depth value (step S1405). Specifically, examples include a method that calculates the disparity vector $dv_{sblk}$ by back projection and re-projection using camera parameters, a method that calculates the disparity vector $dv_{sblk}$ by a transform using a homography matrix, a method that calculates the disparity vector $dv_{sblk}$ by referring to a pre-constructed lookup table of disparity vectors for depth values, and the like.

Once the disparity vector is obtained, the motion information generation unit 105 calculates the corresponding position in the reference view (step S1406). Specifically, the corresponding position is calculated by adding the disparity vector $dv_{sblk}$ to a point $P_{sblk}$ (a pixel position previously determined for the prediction region) that represents the subregion sblk. For the point that represents the subregion, a predetermined position, such as the upper left or the center of the subregion, may be used. It is to be noted that it is necessary for the position that is set as the representative point to be the same as the decoding end.

Then, the motion information generation unit 105 sets reference view motion information stored for a region containing the corresponding point $P_{sblk}+dv_{sblk}$ in the reference view as the motion information for the subregion sblk (motion information in the prediction region) (step S1407). It is to be noted that if motion information for the region containing the corresponding point $P_{sblk}+dv_{sblk}$ is not stored, it is acceptable for information without motion information to be set, for default motion information such as a zero vector to be set, or for a region in which motion information closest to that of the corresponding point $P_{sblk}+dv_{sblk}$ is stored to be identified and then the motion information stored in the region to be set. However, the motion information is set in accordance with the same rule as the decoding end.

In the foregoing description, the reference view motion information is set as the motion information without change. However, it is acceptable for a time interval to be preset, the motion information to be scaled in accordance with the predetermined time interval and the time interval in the reference view motion information, and motion information obtained by replacing the time interval in the reference view motion information with the predetermined time interval to be set. By doing so, all the pieces of motion information generated for different regions have the same time interval. Therefore, it becomes possible to standardize the reference image at the time the view synthesis image is generated (sets a single already-encoded frame in the encoding target view that is different from the encoding target image as a reference image) and to restrict the memory space that is accessed. It is to be noted that it becomes possible to allow cache hits to occur and improve the processing speed by restricting the memory space that is accessed.

In the present embodiment, the view synthesis image (a first prediction image) is generated using only motion information generated from the reference view motion information for each subregion. However, in addition to the motion information, the disparity vector $dv_{sblk}$ obtained for each subregion may be used. For example, when a decoded image for the reference view is denoted as DecIV, the view synthesis image may be generated by the following formula (a prediction image for the prediction region may be generated by calculating an integer obtained by rounding an average value of the first prediction image and a second prediction image).

$$\text{Syn}[p]=(\text{Dec}_{Ref(p)}[p+mv(p)]+\text{DecIV}[p+dv(p)]+1)/2$$

It is to be noted that dv(p) denotes the disparity vector for the subregion containing the pixel p.

Moreover, the view synthesis image may be generated while selecting either one of the motion information and the disparity vector for each subregion or pixel. Further, either one or both of the motion information and the disparity vector may be selected. It is to be noted that any method may be used for the selection as long as it is the same method as the decoding end. Examples include a method that generates the view synthesis image using the disparity vector if the reference view motion information set in step S1407 for the corresponding point calculated in step S1406 is not present or if prediction other than motion-compensated prediction is used in the region containing the corresponding point at the time the moving image for the reference view is encoded, and generates the view synthesis image using the motion information in all other cases.

Another method includes a method that generates the view synthesis image using the disparity vector if the motion-compensated prediction residual amount that is encoded in the region containing the corresponding point of the moving image for the reference view is greater than a predetermined threshold, and generates the view synthesis image using the motion information if the motion-compensated prediction residual amount is less than or equal to the threshold.

Still another method includes a method that determines which is to be selected among the motion information and the disparity vector, by using a decoded image $\text{DecIV}_T$ at a time interval T in the reference view. For example, it is acceptable for an encoded moving image in the reference view to be used, and for a prediction residual in the region sblk+$dv_{sblk}$ at the time motion-compensated prediction is performed using the motion information generated for sblk to be generated and used. Specifically, the view synthesis image is generated using the disparity vector if the generated prediction residual amount is larger than a predetermined threshold, and the view synthesis image is generated using the motion information if the amount is less than or equal to the threshold. It is to be noted that the prediction residual ResIVMC used at this time is expressed by the following formula.

$$\text{ResIVMC}=\text{DecIV}[\text{sblk}+dv_{sblk}]-\text{DecIV}_{Ref(sblk)}[\text{sblk}+dv_{sblk}+mv(\text{sblk})]$$

Another method using $\text{DecIV}_T$ includes a method that generates and use the following prediction residual ResPastIV in addition to ResIVMC. Specifically, |ResIVMC| is compared with |ResPastIV|, the view synthesis image is generated using the motion information if |ResIVMC| is smaller, and the view synthesis image is generated using the disparity vector if |ResPastIV| is smaller. If both are equal, then either one may be used, or both may be used.

$$\text{ResPastIV}=\text{Dec}_{Ref(sblk)}[\text{sblk}+mv(\text{sblk})]-\text{DecIV}_{Ref(sblk)}[\text{sblk}+dv_{sblk}+mv(\text{sblk})]$$

Furthermore, thresholds may be set, |ResIVMC| and |ResPastIV| may be compared with the set thresholds, respectively, and the view synthesis image may be generated using only the information corresponding to one that is less than the threshold. At this time, if both are larger than the thresholds, only the information corresponding to the residual having the smaller value may be used or both may be used in accordance with the rule described above.

Moreover, if the decoded image $\text{DecIV}_T$ at the time interval T in the reference view is used, the view synthesis image or a candidate therefor may be generated in accordance with the following formulas.

$$\text{Syn}[p]=\text{Dec}_{Ref(p)}[p+mv(p)]+w0\times(\text{DecIV}[p+dv(p)]-\text{DecIV}_{Ref(p)}[p+dv(p)+mv(p)])$$

$$\text{Syn}[p]=\text{DecIV}[p+dv(p)]+w1\times(\text{Dec}_{Ref(p)}[p+mv(p)]-\text{DecIV}_{Ref(p)}[p+dv(p)+mv(p)])$$

Here, w0 and w1 denote separately determined weighting factors, which may be determined in any manner as long as they are the same values as the decoding end. For example, predetermined values may be used. If the image generated in accordance with the formulas mentioned above is used as a candidate for the view synthesis image, the image generated in accordance with the formulas mentioned above may be used in place of the above-described view synthesis image generated using only the motion information generated from the reference view motion information, or in place of the view synthesis image generated using only the disparity vector obtained for each subregion, or the image generated in accordance with the formulas may also be added to the options as another candidate.

Figure 4:
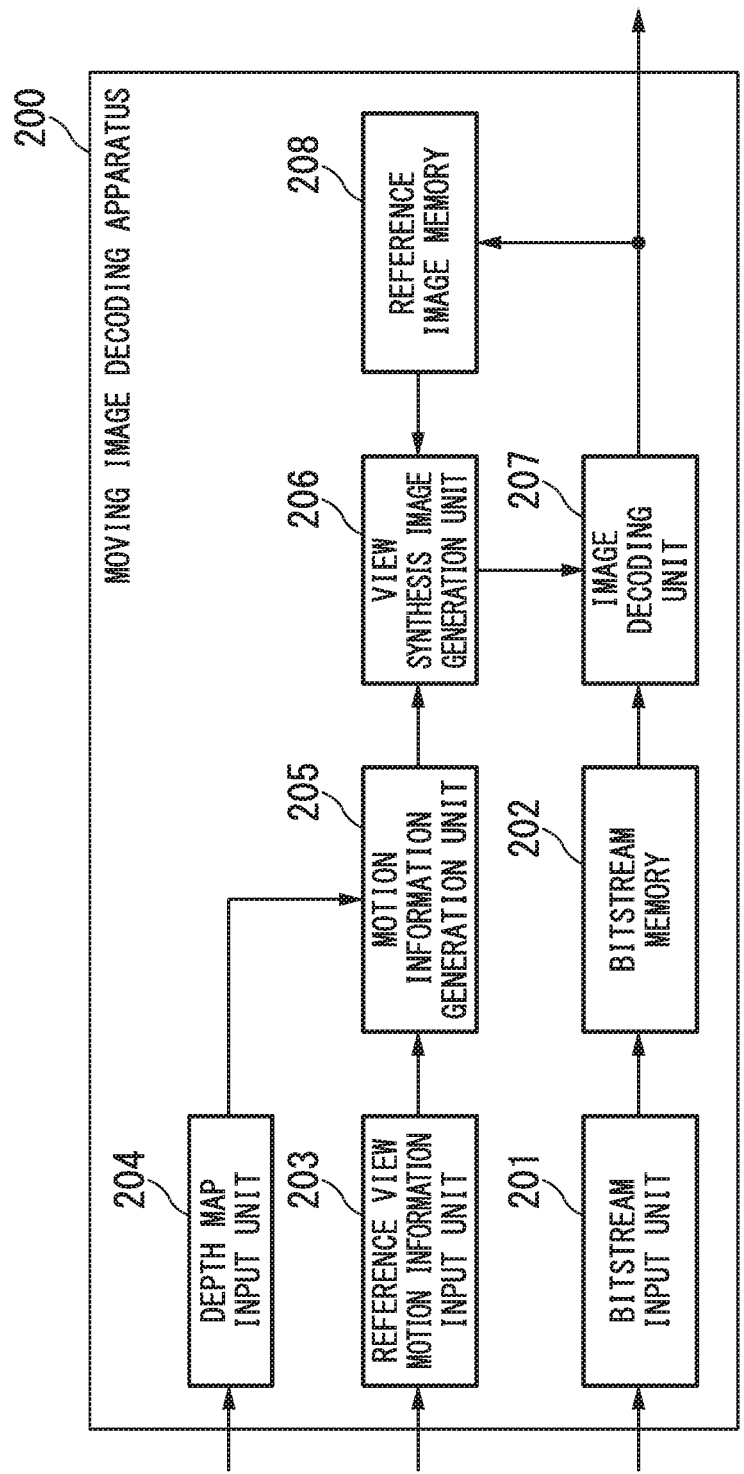
FIG. 4 is a block diagram showing a configuration of a moving image decoding apparatus in accordance with an embodiment of the present invention.

Next, a moving image decoding apparatus in the present embodiment is described. FIG. 4 is a block diagram showing a configuration of the moving image decoding apparatus in the present embodiment. As shown in FIG. 4, the moving image decoding apparatus 200 is provided with a bitstream input unit 201, a bitstream memory 202, a reference view motion information input unit 203, a depth map input unit 204, a motion information generation unit 205, a view synthesis image generation unit 206, an image decoding unit 207, and a reference image memory 208.

The bitstream input unit 201 inputs a bitstream of a moving image that serves as a decoding target. Hereunder, a single frame of the moving image that serves as the decoding target is referred to as a decoding target image. Here, the decoding target image refers to a single frame of the moving image of camera B. Furthermore, hereunder, the view from which the decoding target image is captured (here, camera B) is referred to as a decoding target view. The bitstream memory 202 stores the input bitstream for the decoding target image. The reference view motion information input unit 203 inputs motion information (a motion vector, or the like) for a moving image of a reference view. Hereunder, the motion information input here is referred to as reference view motion information. Here, it is assumed that motion information of camera A is input.

The depth map input unit 204 inputs a depth map that is referred to at the time a view synthesis image is generated. Here, it is assumed that a depth map for the decoding target image is input. However, it may also be a depth map for a different view, such as the reference view. It is to be noted that the depth map indicates the three-dimensional position of an object shown in pixels of a corresponding image. The depth map may be any type of information as long as the three-dimensional position can be obtained by separately provided information, such as camera parameters. For example, the distance from a camera to the object, coordinate values for an axis that is not parallel to the image plane, or a disparity amount for another camera (e.g., camera A) can be used. Furthermore, since it is sufficient for a disparity amount to be obtained here, a disparity map that directly expresses the disparity amount may be used instead of a depth map. It is to be noted that here, although the depth map is given in the form of an image, it is not necessarily in the form of an image as long as the same information can be obtained.

The motion information generation unit 205 uses the reference view motion information and the depth map to generate motion information for the decoding target image. The view synthesis image generation unit 206 generates a view synthesis image for the decoding target image from a reference image based on the generated motion information. The image decoding unit 207 decodes the decoding target image from the bitstream while using the view synthesis image and outputs it. The reference image memory 208 stores the obtained decoding target image for subsequent decoding.

Figure 5:
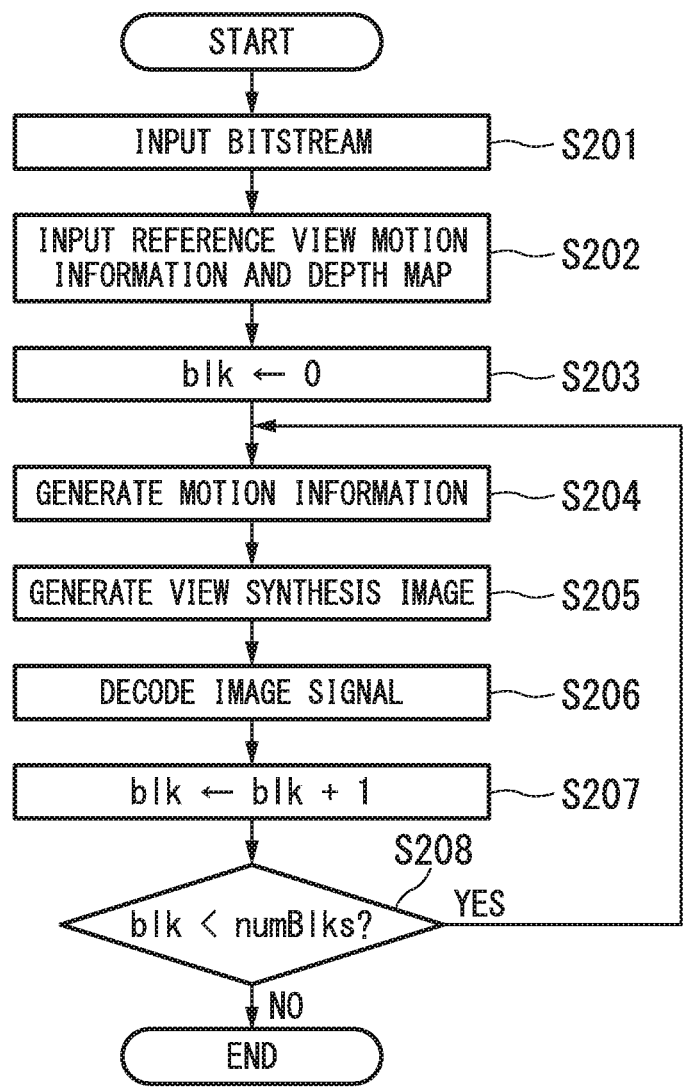
FIG. 5 is a flowchart showing an operation of the moving image decoding apparatus 200 shown in FIG. 4.

Next, an operation of the moving image decoding apparatus 200 shown in FIG. 4 is described with reference to FIG. 5. FIG. 5 is a flowchart showing the operation of the moving image decoding apparatus 200 shown in FIG. 4. Firstly, the bitstream input unit 201 inputs a bitstream obtained by encoding the decoding target image and stores the input bitstream in the bitstream memory 202 (step S201). Next, the reference view motion information input unit 203 inputs reference view motion information and outputs the input reference view motion information to the motion information generation unit 205. Moreover, the depth map input unit 204 inputs a depth map and outputs the input depth map to the motion information generation unit 205 (step S202).

It is to be noted that the reference view motion information and the depth map input in step S202 are assumed to be the same as those used on the encoding end. This is in order to suppress the generation of coding noise, such as drift, by using exactly the same information as that obtained by the moving image encoding apparatus. However, if the generation of such coding noise is allowed, it is acceptable for those that are different from those used at the time of encoding to be input. For the depth map, instead of a depth map that has been separately decoded, a depth map that is estimated by applying stereo matching, or the like, to a multiview image that has been decoded with respect to a plurality of cameras, a depth map estimated using a decoded disparity vector or motion vector, or the like, may also be used.

As the reference view motion information, motion information used at the time an image for the reference view was decoded may be used, or information separately encoded for the reference view may be used. Furthermore, it is possible to decode a moving image for the reference view and to use motion information obtained by estimation therefrom.

Following completion of the input of the bitstream, the reference view motion information, and the depth map, the decoding target image is divided into regions with a predetermined size, and a video signal of the decoding target image is decoded from the bitstream for each of the divided regions (steps S203 to S208). That is, when the decoding target region index is denoted by blk and the total number of decoding target regions within a single frame is denoted by numBlks, blk is initialized to 0 (step S203) and then the following processing (steps S204 to S206) is repeated while adding 1 to blk (step S207) until blk reaches numBlks (step S208). In a general decoding, division into processing unit blocks of 16 pixels×16 pixels referred to as macro blocks is performed. However, division into blocks of another size may be performed as long as it is the same as that on the encoding end.

In the processing repeated for each decoding target region, firstly, the motion information generation unit 205 generates motion information for the decoding target region blk (step S204). The processing here is the same as in step S104 described above. Once the motion information for the decoding target region blk is obtained, the view synthesis image generation unit 206 generates a view synthesis image Syn for the decoding target region blk from an image stored in the reference image memory 208 in accordance with the motion information (step S205). The processing here is the same as in step S205 described above.

Next, once the view synthesis image is obtained, the image decoding unit 207 decodes the decoding target image from the bitstream using the view synthesis image as a prediction image (step S206). The obtained decoding target image is stored in the reference image memory 208 and becomes the output of the moving image decoding apparatus 200.

For the decoding of the decoding target image, a method corresponding to the method used at the time of encoding is used. For example, when a general coding such as MPEG-2 or H.264/AVC is used, the video signal is decoded by sequentially applying entropy decoding, inverse binarization, inverse quantization, and a frequency inverse transform such as an inverse discrete cosine transform (IDCT) to encoded data, adding a prediction image to the obtained two-dimensional signal, and lastly performing clipping within the range of the pixel values.

In the foregoing description, generation of motion information and generation of a view synthesis image are performed for each divided region of the encoding target image or the decoding target image. However, the motion information or both the motion information and the view synthesis image may be generated for the entire encoding target image or decoding target image. When the motion information is generated for the entire image, a memory that buffers the generated motion information becomes necessary. Furthermore, when both the motion information and the view synthesis image are generated for the entire image, a memory for storing the generated view synthesis image becomes necessary.

Moreover, in the foregoing description, processing of the present technique is described as processing that encodes/decodes an entire image. However, it is also possible to apply the processing to only part of an image. In this case, it is acceptable for whether or not processing is to be applied to be determined and then for a flag that indicates the necessity of application to be encoded or decoded, or the necessity of application may also be specified by any other means. For example, a method that expresses the necessity of application may be used as one of modes that indicate a technique that generates a prediction image for each region.

In this manner, at the time a view synthesis image is generated using a disparity obtained from a depth map, rather than directly predicting pixel values between views, by predicting the pixel values in the time domain after predicting a motion vector between the views, it becomes possible to achieve prediction with a fractional pixel accuracy and encode a multiview moving image with a small bitrate even when the accuracy of the disparity expressed by the depth map is low.

Figure 6:
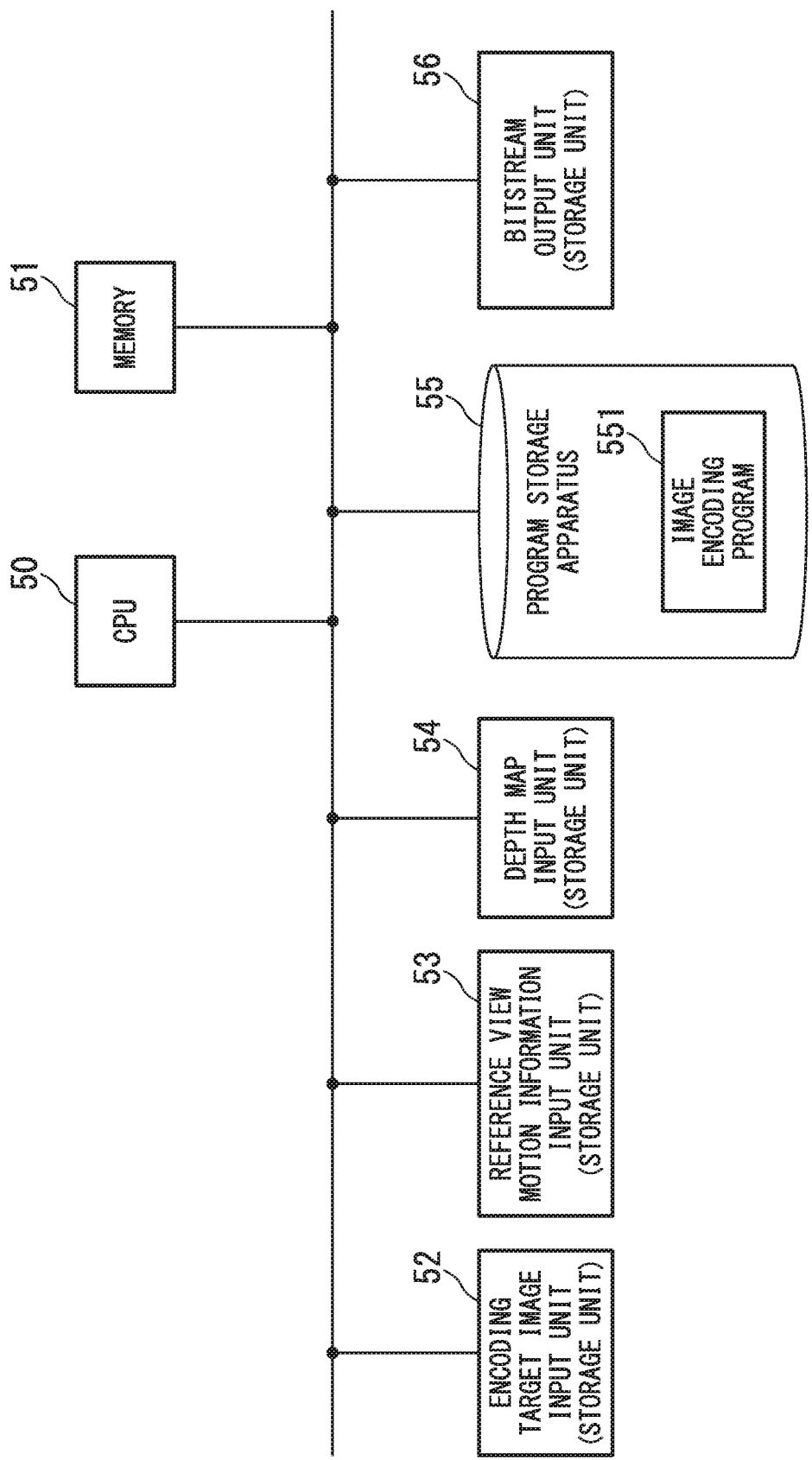
FIG. 6 is a block diagram showing a hardware configuration when the moving image encoding apparatus 100 shown in FIG. 1 is configured by a computer and a software program.

FIG. 6 is a block diagram showing a hardware configuration when the moving image encoding apparatus 100 described above is configured by a computer and a software program. The system shown in FIG. 6 has a configuration in which there are connected by a bus: a central processing unit (CPU) 50 that executes a program; a memory 51 such as a random access memory (RAM) in which the program and data accessed by the CPU 50 are stored; an encoding target image input unit 52 (may also be a storage unit such as a disk apparatus that stores an image signal) that inputs an encoding target image signal from a camera or the like; a reference view motion information input unit 53 (may also be a storage unit such as a disk apparatus that stores motion information) that inputs motion information of a reference view from a memory or the like; a depth map input unit 54 (may also be a storage unit such as a disk apparatus that stores a depth map) that inputs a depth map for a view from which an encoding target image is captured from a depth camera or the like; a program storage apparatus 55 that stores an image encoding program 551 which is a software program that makes the CPU 50 execute moving image encoding processing; and a bitstream output unit 56 (may also be a storage unit such as a disk apparatus that stores a bitstream) that outputs via a network, for example, a bitstream generated by the CPU 50 executing the image encoding program 551 loaded into the memory 51.

Figure 7:
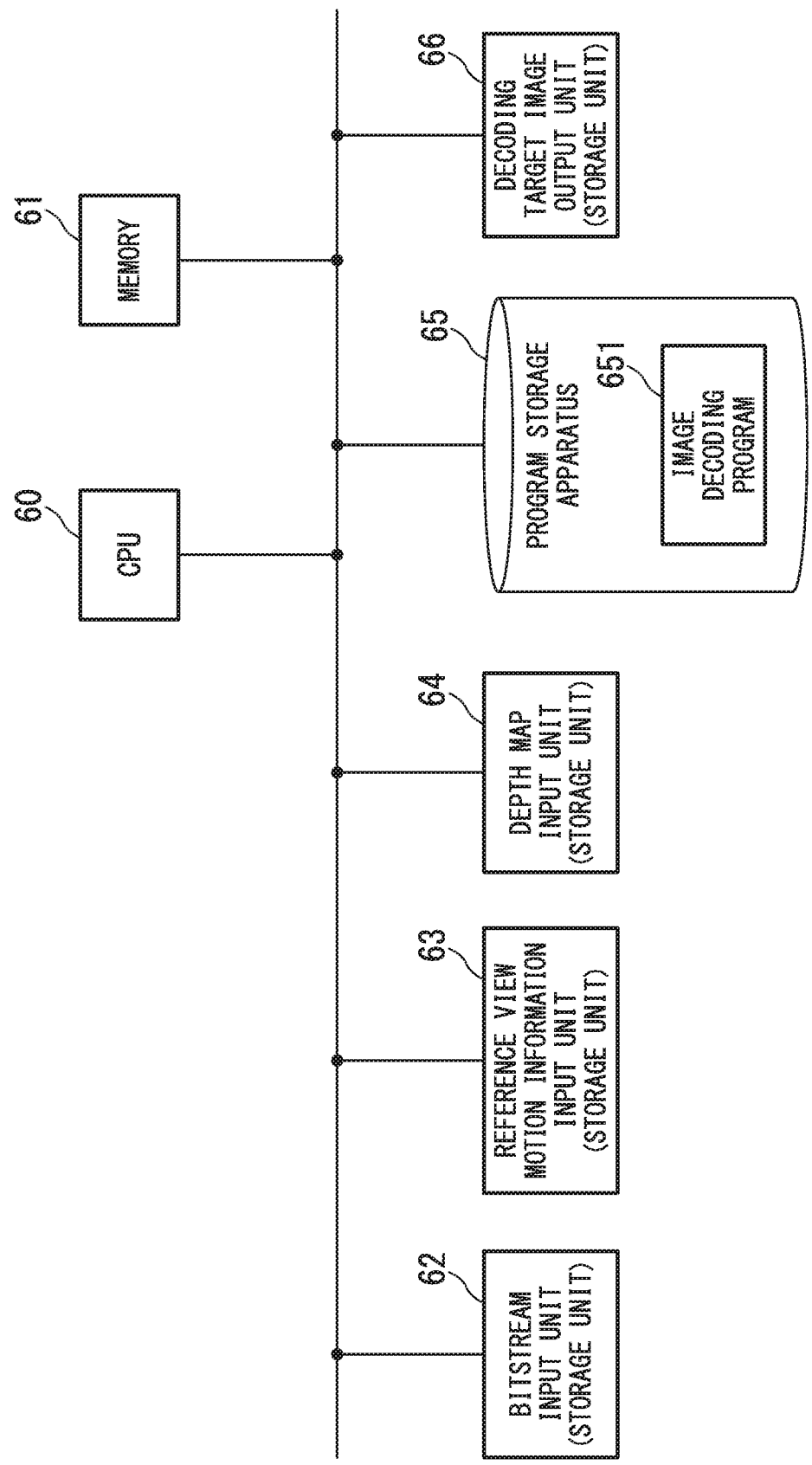
FIG. 7 is a block diagram showing a hardware configuration when the moving image decoding apparatus 200 shown in FIG. 4 is configured by a computer and a software program.
Figure 8:
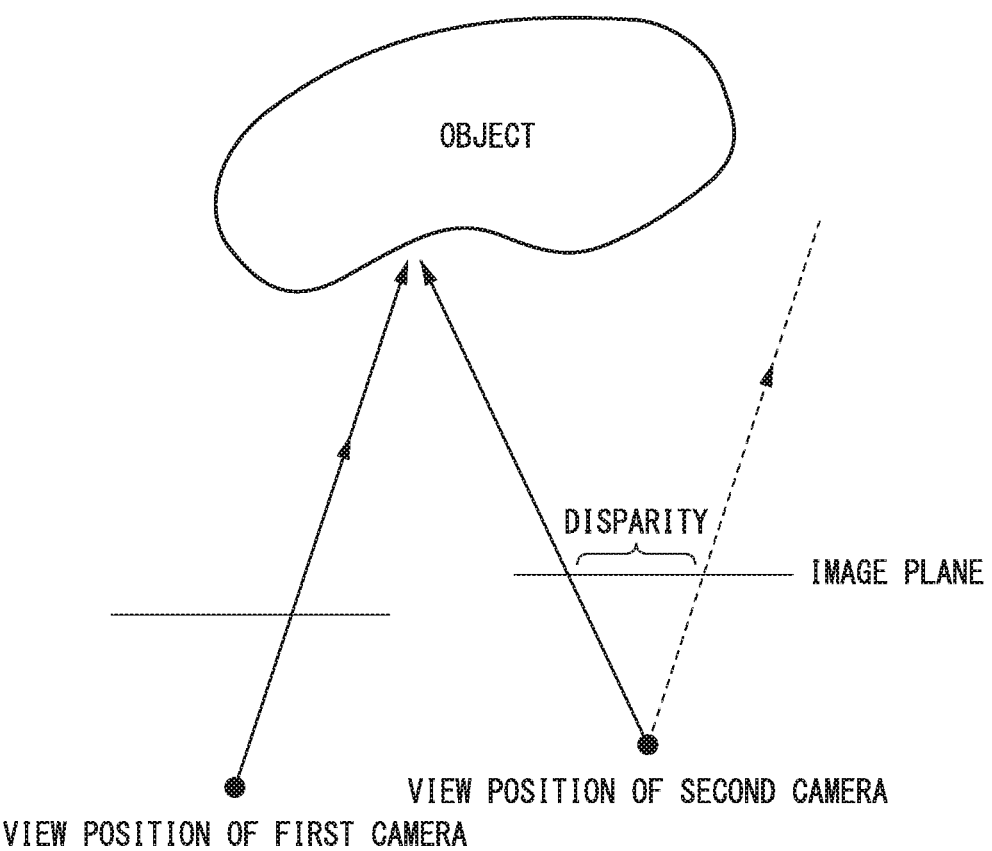
FIG. 8 is a schematic diagram showing a disparity that occurs between cameras.
Figure 9:
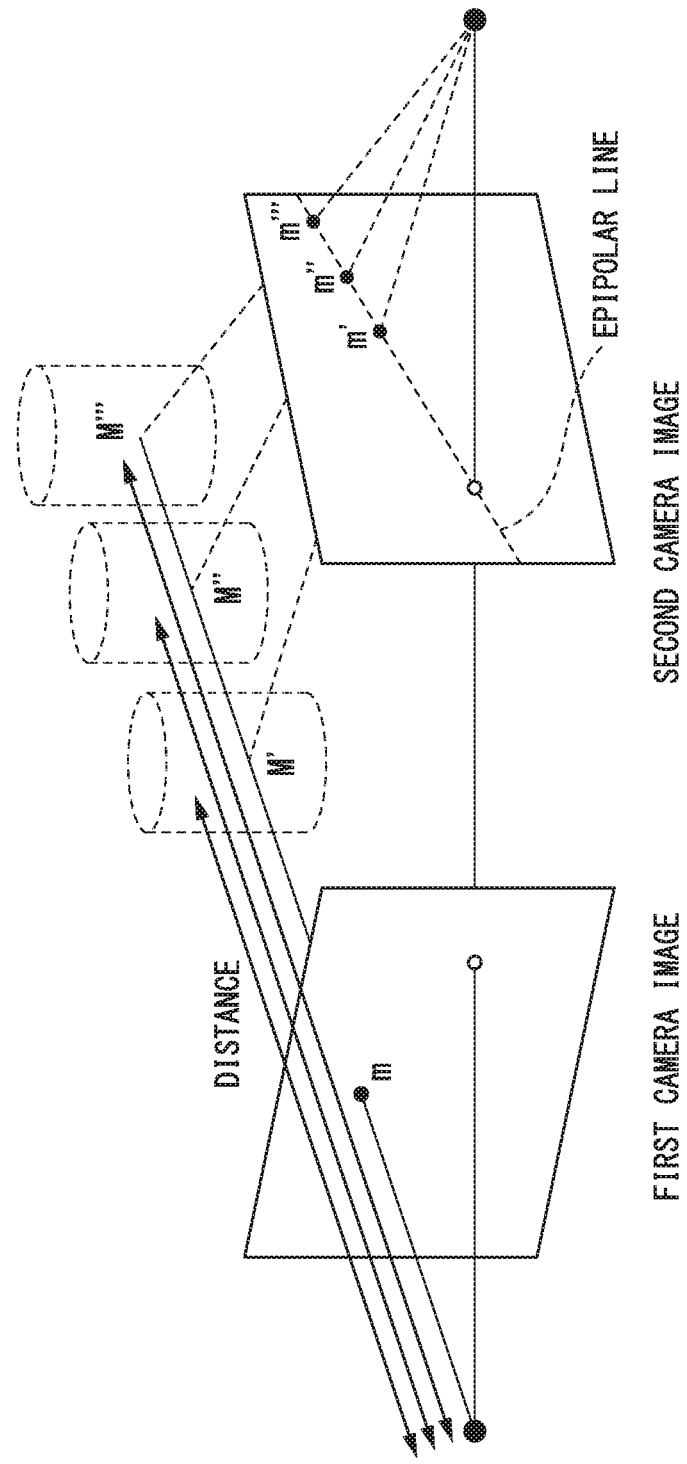
FIG. 9 is a schematic diagram of an epipolar geometry constraint.

FIG. 7 is a block diagram showing a hardware configuration when the moving image decoding apparatus 200 described above is configured by a computer and a software program. The system shown in FIG. 7 has a configuration in which there are connected by a bus: a CPU 60 that executes a program; a memory 51 such as a RAM which stores the program and data accessed by the CPU 60; a bitstream input unit 62 (may also be a storage unit such as a disk apparatus that stores a bitstream) that inputs a bitstream encoded by the moving image encoding apparatus in accordance with the present technique; a reference view motion information input unit 63 (may also be a storage unit such as a disk apparatus that stores motion information) that inputs motion information of a reference view from a memory or the like; a depth map input unit 64 (may also be a storage unit such as a disk apparatus that stores depth information) that inputs a depth map for a view from which a decoding target is captured from a depth camera or the like; a program storage apparatus 65 that stores an image decoding program 651 which is a software program that makes the CPU 60 execute image decoding processing; and a decoding target image output unit 66 (may also be a storage unit such as a disk apparatus that stores an image signal) that outputs, to a playback apparatus or the like, a decoding target image obtained by performing decoding on the bitstream by means of the CPU 60 executing the image decoding program 651 loaded into the memory 61.

The moving image encoding apparatus 100 and the moving image decoding apparatus 200 in accordance with the embodiment described above may be achieved by a computer. In that case, the moving image encoding apparatus 100 and the moving image decoding apparatus 200 may be achieved by recording a program for achieving the functionalities on a computer-readable recording medium, reading the program recorded on the recording medium into a computer system, and then executing it. It is to be noted that the "computer system" referred to here is one including an operating system (OS) and hardware, such as peripheral devices. Furthermore, the "computer-readable recording medium" refers to a portable medium such as a flexible disk, a magnetic optical disk, a read only memory (ROM), a compact disc (CD)-ROM, or a storage apparatus such as a hard disk that is built into the computer system. In addition, the "computer-readable recording medium" may also include those that dynamically retain the program for a short time in the manner of communication lines when the program is transmitted via a network, such as the Internet, or a communication circuit, such as a telephone line, and those that retain the program for a fixed time period, such as a volatile memory within a computer system that functions as a server or a client in that case. Moreover, the program may be one for achieving part of the functionalities described above. Further, it may be one that is able to achieve the functionalities described above in combination with a program that is pre-recorded on the computer system. Furthermore, the moving image encoding apparatus 100 and the moving image decoding apparatus 200 may be achieved using hardware such as a programmable logic device (PLD) or a field programmable gate array (FPGA).

An embodiment of the present invention has been described above with reference to the drawings. However, the embodiment described above is merely an illustration of the present invention, and it is clear that the present invention is in no way limited to the embodiment described above. Therefore, additions, omissions, substitutions, and other changes to the structural elements may be carried out within a range that does not depart from the technical idea and scope of the present invention.

INDUSTRIAL APPLICABILITY

The present invention is applicable, for example, to applications that, at the time view synthesis prediction for an encoding (decoding) target image is performed using an image that has been captured from a view different from a view from which the encoding (decoding) target image has been captured, and a depth map for an object within the images, achieve a high coding efficiency even if the depth map does not express disparity information of a high accuracy.

DESCRIPTION OF REFERENCE SYMBOLS

100 Moving image encoding apparatus
101 Encoding target image input unit
102 Encoding target image memory
103 Reference view motion information input unit
104 Depth map input unit
105 Motion information generation unit
106 View synthesis image generation unit
107 Image encoding unit
108 Image decoding unit
109 Reference image memory
200 Moving image decoding apparatus
201 Bitstream input unit
202 Bitstream memory
203 Reference view motion information input unit
204 Depth map input unit
205 Motion information generation unit
206 View synthesis image generation unit
207 Image decoding unit
208 Reference image memory

The invention claimed is:

1. A moving image encoding apparatus that, at the time a single frame of a multiview moving image comprising moving images of a plurality of different views is encoded, while performing prediction between the different views using reference view motion information that is motion information in a reference view image for a reference view that is different from an encoding target image and a depth map for object within the multiview moving image, performs encoding of an encoding target region that is one of regions obtained by dividing the encoding target image, the moving image encoding apparatus comprising:

a corresponding region setting unit that sets a corresponding region on the depth map for the encoding target region;

a region dividing unit that sets a plurality of prediction regions that are regions obtained by dividing the encoding target region;

a disparity vector generation unit that, for each of the prediction regions, generates a disparity vector for the reference view using only depth information for a region within the corresponding region that corresponds to each of the prediction regions;

a motion information generation unit that generates motion information in each of the prediction regions from the reference view motion information based on the disparity vector for the reference view; and a prediction image generation unit that generates a prediction image for each of the prediction regions using the motion information in each of the prediction regions, wherein each of the prediction regions includes a plurality of pixels, a plurality of disparity vectors that correspond to the plurality of prediction regions are generated for the encoding target region, the disparity vector generation unit further generates, for the encoding target region, a disparity vector for the depth map, the corresponding region setting unit sets a region indicated by the disparity vector for the depth map as the corresponding region, the depth map corresponds to an image in a view that is different from a view of the encoding target image, the position of the corresponding region is different from the position of the encoding target region, and the disparity vector for the depth map goes from the view of the encoding target image to the view that is different from the view of the encoding target image.

2. The moving image encoding apparatus according to claim 1, wherein the disparity vector generation unit sets the disparity vector for the depth map using a disparity vector used at the time a region adjacent to the encoding target region is encoded.

3. The moving image encoding apparatus according to claim 1, wherein the region dividing unit sets a region division for the encoding target region based on depth information within the corresponding region.

4. The moving image encoding apparatus according to claim 1, wherein the disparity vector generation unit sets, for each of the prediction regions, a representative depth from the depth information in the region within the corresponding region that corresponds to each of the prediction regions and sets the disparity vector for the reference view based on the representative depth.

5. The moving image encoding apparatus according to claim 1, wherein the motion information generation unit determines a corresponding position in the reference view using a pixel position previously determined for each of the prediction regions and the disparity vector for the reference view, and sets motion information provided for a region including the corresponding position among the reference view motion information as the motion information in each of the prediction regions.

6. The moving image encoding apparatus according to claim 1, further comprising a reference image setting unit that sets a single already-encoded frame in an encoding target view that is different from the encoding target image as a reference image for the encoding target image, wherein the motion information generation unit generates the motion information in each of the prediction regions by scaling motion information obtained from the reference view motion information in accordance with a time interval between the encoding target image and the reference image.

7. The moving image encoding apparatus according to claim 1, wherein the prediction image generation unit generates the prediction image for each of the prediction regions using a first prediction image generated using the motion information in each of the prediction regions and a second prediction image generated using the disparity vector for the reference view and the reference view image.

8. A moving image decoding apparatus that, at the time a decoding target image is decoded from encoded data of a multiview moving image comprising moving images of a plurality of different views, while performing prediction between the different views using reference view motion information that is motion information in a reference view image for a reference view that is different from the decoding target image and a depth map for an object within the multiview moving image, performs decoding of a decoding target region that is one of regions obtained by dividing the decoding target image, the moving image decoding apparatus comprising:

a corresponding region setting unit that sets a corresponding region on the depth map for the decoding target region;
  a region dividing unit that sets a plurality of prediction regions that are regions obtained by dividing the decoding target region;
  a disparity vector generation unit that, for each of the prediction regions, generates a disparity vector for the reference view using only depth information for a region within the corresponding region that corresponds to each of the prediction regions;
  a motion information generation unit that generates motion information in each of the prediction regions from the reference view motion information based on the disparity vector for the reference view; and
  a prediction image generation unit that generates a prediction image for each of the prediction regions using the motion information in each of the prediction regions,
  wherein each of the prediction regions includes a plurality of pixels,
  a plurality of disparity vectors that correspond to the plurality of prediction regions are generated for the decoding target region,
  the disparity vector generation unit further generates, for the decoding target region, a disparity vector for the depth map,
  the corresponding region setting unit sets a region indicated by the disparity vector for the depth map as the corresponding region,
  the depth map corresponds to an image in a view that is different from a view of the decoding target image,
  the position of the corresponding region is different from the position of the decoding target region, and
  the disparity vector for the depth map goes from the view of the decoding target image to the view that is different from the view of the decoding target image.

9. The moving image decoding apparatus according to claim 8, wherein the disparity vector generation unit sets the disparity vector for the depth map using a disparity vector used at the time a region adjacent to the decoding target region is decoded.

10. The moving image decoding apparatus according to claim 8, wherein the region dividing unit sets a region division for the decoding target region based on depth information within the corresponding region.

11. The moving image decoding apparatus claim 8, wherein the disparity vector generation unit sets, for each of the prediction regions, a representative depth from the depth information in the region within the corresponding region that corresponds to each of the prediction regions and sets the disparity vector for the reference view based on the representative depth.

12. The moving image decoding apparatus according to claim 8, wherein the motion information generation unit determines a corresponding position in the reference view using a pixel position previously determined for each of the prediction regions and the disparity vector for the reference view, and sets motion information provided for a region including the corresponding position among the reference view motion information as the motion information in each of the prediction regions.

13. The moving image decoding apparatus according to claim 8, further comprising a reference image setting unit that sets a single already-decoded frame in a decoding target view that is different from the decoding target image as a reference image for the decoding target image,
  wherein the motion information generation unit generates the motion information in each of the prediction regions by scaling motion information obtained from the reference view motion information in accordance with a time interval between the decoding target image and the reference image.

14. The moving image decoding apparatus according to claim 8, wherein the prediction image generation unit generates the prediction image for each of the prediction regions using a first prediction image generated using the motion information in each of the prediction regions and a second prediction image generated using the disparity vector for the reference view and the reference view image.

15. A moving image encoding method that, at the time a single frame of a multiview moving image comprising moving images of a plurality of different views is encoded, while performing prediction between the different views using reference view motion information that is motion information in a reference view image for a reference view that is different from an encoding target image and a depth map for an object within the multiview moving image, performs encoding of an encoding target region that is one of regions obtained by dividing the encoding target image, the moving image encoding method comprising:

a corresponding region setting step of setting a corresponding region on the depth map for the encoding target region;
  a region dividing step of setting a plurality of prediction regions that are regions obtained by dividing the encoding target region;
  a disparity vector generation step of generating, for each of the prediction regions, a disparity vector for the reference view using only depth information for a region within the corresponding region that corresponds to each of the prediction regions;
  a motion information generation step of generating motion information in each of the prediction regions from the reference view motion information based on the disparity vector for the reference view; and
  a prediction image generation step of generating a prediction image for each of the prediction regions using the motion information in each of the prediction regions,
  wherein each of the prediction regions includes a plurality of pixels,
  a plurality of disparity vectors that correspond to the plurality of prediction regions are generated for the encoding target region,
  the disparity vector generation step further generates, for the encoding target region, a disparity vector for the depth map,
  the corresponding region setting step sets a region indicated by the disparity vector for the depth map as the corresponding region,
  the depth map corresponds to an image in a view that is different from a view of the encoding target image, the position of the corresponding region is different from the position of the encoding target region, and the disparity vector for the depth map goes from the view of the encoding target image to the view that is different from the view of the encoding target image.

16. A moving image decoding method that, at the time a decoding target image is decoded from encoded data of a multiview moving image comprising moving images of a plurality of different views, while performing prediction between the different views using reference view motion information that is motion information in a reference view image for a reference view that is different from the decoding target image and a depth map for an object within the multiview moving image, performs decoding of a decoding target region that is one of regions obtained by dividing the decoding target image, the moving image decoding method comprising:

a corresponding region setting step of setting a corresponding region on the depth map for the decoding target region;

a region dividing step of setting a plurality of prediction regions that are regions obtained by dividing the decoding target region;

a disparity vector generation step of generating, for each of the prediction regions, a disparity vector for the reference view using only depth information for a region within the corresponding region that corresponds to each of the prediction regions;

a motion information generation step of generating motion information in each of the prediction regions from the reference view motion information based on the disparity vector for the reference view; and a prediction image generation step of generating a prediction image for each of the prediction regions using the motion information in each of the prediction regions, wherein each of the prediction regions includes a plurality of pixels, a plurality of disparity vectors that correspond to the plurality of prediction regions are generated for the decoding target region, the disparity vector generation step further generates, for the decoding target region, a disparity vector for the depth map, the corresponding region setting step sets a region indicated by the disparity vector for the depth map as the corresponding region, the depth map corresponds to an image in a view that is different from a view of the decoding target image, the position of the corresponding region is different from the position of the decoding target region, and the disparity vector for the depth map goes from the view of the decoding target image to the view that is different from the view of the decoding target image.

17. A non-transitory computer-readable medium storing a moving image encoding program for executing the moving image encoding method according to claim 15 on a computer.

18. A non-transitory computer-readable medium storing a moving image decoding program for executing the moving image decoding method according to claim 16 on a computer.

* * * * *